United States Patent
Krause et al.

(10) Patent No.: US 8,484,120 B2
(45) Date of Patent: Jul. 9, 2013

(54) METHOD AND APPARATUS FOR GENERATING AND DISTRIBUTING CREATIVE WORKS

(76) Inventors: Thomas W. Krause, Falls Church, VA (US); Philip R. Krause, Bethesda, MD (US)

(*) Notice: Subject to any disclaimer, the term of this patent is extended or adjusted under 35 U.S.C. 154(b) by 4334 days.

(21) Appl. No.: 10/092,498

(22) Filed: Mar. 8, 2002

(65) Prior Publication Data
US 2002/0178082 A1 Nov. 28, 2002

Related U.S. Application Data

(60) Provisional application No. 60/293,169, filed on May 25, 2001.

(51) Int. Cl.
G06Q 40/00 (2012.01)
(52) U.S. Cl.
USPC ........................................... 705/37; 705/26.3
(58) Field of Classification Search
USPC ................... 705/37, 17.71, 26.1–26.4, 35
See application file for complete search history.

(56) References Cited

U.S. PATENT DOCUMENTS

| | | | | |
|---|---|---|---|---|
| 5,794,219 A * | 8/1998 | Brown | | 705/37 |
| 6,973,439 B1 * | 12/2005 | Wilk | | 705/35 |
| 7,062,457 B1 * | 6/2006 | Kaufman | | 705/35 |
| 7,130,825 B2 * | 10/2006 | Vlahoplus et al. | | 705/37 |
| 7,188,069 B2 * | 3/2007 | Hagelin | | 705/1 |
| 2001/0014876 A1 * | 8/2001 | Miyashita | | 705/37 |
| 2002/0002523 A1 * | 1/2002 | Kossovsky et al. | | 705/36 |
| 2002/0049816 A1 * | 4/2002 | Costin et al. | | 709/206 |
| 2002/0116215 A1 * | 8/2002 | Lawrence et al. | | 705/1 |
| 2002/0138384 A1 * | 9/2002 | Malackowski et al. | | 705/36 |
| 2002/0143625 A1 * | 10/2002 | Waldeyer | | 705/14 |

OTHER PUBLICATIONS

From the Wayback Machine at www.archive.org http://web.archive.org/web/20001017101320/www.bounty.org/proposals/index.html Archived copies from Oct. 17, 2000 of the website www.bounty.org/proposals/index.html Bounty Server, The proposals: (1 page).*

From the Wayback Machine at www.archive.org http://web.archive.org/web/20001017123028/www.bounty.org/proposals/proposal1.html Archived copies from Oct. 17, 2000 of the website www.bounty.org/proposals/proposal1.html Bounty Server, The proposal: (4 pages).*

* cited by examiner

Primary Examiner — Mary Cheung

(57) ABSTRACT

A method and apparatus for promoting the creation and distribution of creative works. The invention provides a novel cooperative auction means collecting funds for payment for inducing a rightholder to donate rights in a piece of intellectual property to the public domain.

17 Claims, 8 Drawing Sheets

Computer system

FIGURE 1. Computer system

METHOD AND APPARATUS FOR GENERATING AND DISTRIBUTING CREATIVE WORKS

RELATED APPLICATIONS

This application claims priority to provisional application Ser. No. 60/293,169 (filed May 25, 2001), which is incorporated herein by reference.

BACKGROUND OF THE INVENTION

1. Field of the Invention

The field of the invention is methods for promoting the creation and distribution of artistic works.

2. Description of the Background Art

The current art for promoting the creation and distribution of artistic works almost invariably operates within the confines of the copyright system, which, as currently implemented, does not always achieve a proper balance between providing an incentive to create and providing wide distribution of creative works.

In the current art, methods for providing digitized information to users via the Internet are commonplace. Using these methods, individuals can buy, sell, trade or rent digitized music, written text, videos, and voice recordings over the Internet. In some cases, such as certain web-sites offering music compressed in the MP3 format—users can download such material for free. Unfortunately, in nearly all cases, the material is copyrighted, and legal limitations on retransmission or creation of derivative works are severe and debilitating. Thus, although a copyrighted work may be posted on the web for a period of time, only those individuals who access it while it is posted will be able to enjoy it, and severe penalties attach should those individuals choose to download the work and then retransmit it to others. As a consequence, authorized circulation of creative works is severely restricted and unauthorized circulation of such works is severely punished.

The ease of copying also acts as a deterrent against posting copyrighted material on the web. Indeed, unscrupulous individuals freely copy and sell copyrighted materials, which, according to the copyright industries, costs the copyright industries billions of dollars every year. The net result is that both artistic and academic materials available on the web are of extremely uneven quality.

The problem of easy copying has had an effect on legislation relating to duplication technology, as it is now against the law to provide a device for circumventing a copy-protection measure. Thus, to protect the interests of copyrightholders, DVD technology uses encryption technology to inhibit or even prevent digital copying of those works, and the law prevents individuals from attempting to circumvent the encryption technology. Digital Audio Tape (DAT), despite offering superior recording technology, was for years unavailable in the United States, because of the fear that such technology, used to copy copyrighted works, would erode the profits of copyrightholders. Although now available, legal restrictions make DAT practically unusable.

For established authors and artists—those who already have a market—the features of the copyright regime discussed above may be beneficial. Such creators will continue to be able to sell their works in the traditional forms (such as paper, compact-disc, videotape or DVD), or in copy-protected electronic form, and may even be able to sell their works directly to their fans over the Internet. Nevertheless, even for these individuals, the restrictions of copyright law result in less circulation than would unrestricted retransmission, and therefore less exposure to the public, and—ultimately—to the extent that increased fame will generate increased revenues—less profit for the author.

A number of web-sites exist to provide readers access to uncopyrighted public domain material, including a site named after the inventor of the printing press. These sites are primarily devoted to posting written material that has fallen into the public domain, and which now can be freely downloaded, copied and retransmitted. For the most part, this public domain material is old; with the most recent extension of the copyright term, most such material will be at least 75 years old in the future, and therefore of limited use to anyone interested in contemporary creative work.

The fact that copyright terms last so long also has stifled the ability of artists to create derivative works based on contemporary works. Moreover, in the case of books that have gone out of print, copyright restrictions have in the past made it extremely expensive for anyone desiring a fresh copy of an out-of-print book to obtain one. Authors of out-of-print books often recognize that they are unlikely to make any more money off of their books, and are often willing to sell the rights to their books at relatively low prices. While the advent of widely-available print-on-demand technology will give consumers access to out-of-print work at relatively high prices, this will not appreciably increase the circulation of the works of out-of-print authors.

It is also a fact that the vast majority of works only go through a single publication—thus, a book will normally only have a first printing; a song will have a first cut, a movie a first release. The vast majority of sales of a given work—in some cases, 100%—will occur within the first five years of its publication. Yet, for the remainder of the author's life, plus a further 75 years, nobody is able to copy it without the permission of the copyright holder.

For the would-be distributor or consumer of copyrighted material, it is in many cases a daunting task to identify the copyright holder, especially if the work is more than 20 years old, and (if a written work), out of print. The restrictive copyright laws thus condemn such works to a much narrower distribution than they would have if the copyright term were shorter, or nonexistent. Given the choice, in hindsight, many authors of such works would prefer that their copyright last only a few years. Under such a regime, the author of a successful book could reap large profits during the period of currency, while the copyright remained in force. During the following period of obscurity (a period during which under the current copyright regime, printing is unprofitable), the author would continue to benefit in terms of reputation and name-recognition by the fact that the book had fallen into the public domain, and was therefore available for widespread distribution. The name-recognition gained or preserved by this trade-off might well outweigh (for the author) any up-front financial advantage he may have gotten from his original publisher as a result of his ability to assign a longer copyright term.

In some cases, copyright holders must rely on the "honor system" to obtain financial reward for copying of copyrighted works. In such cases, copiers are encouraged to first ask the author for permission to copy, and then to pay some amount for that privilege. But even when it is relatively easy to do so, few individuals wishing to copy a book would actually take the trouble to contact the author. One set would assume that permission would not be granted and would simply not do the copying. The other set would do the copying, thereby infringing the author's copyright.

In the area of digital music, a growing number of contemporary works are available royalty-free on the Internet, as musicians realize that they will always gain wider distribution if they relinquish rights in their works. Indeed the EFF Open Source Audio License is a mechanism to encourage this behavior. Royalty-free works, however, normally are available along-side, and in competition with copyrighted works (which, as of the time of this application, were freely available through services such as Napster and Aimster). Given the choice, regardless of the potential charge of copyright infringement, many users automatically choose the copyrighted works.

Thus, the copyright laws have resulted in a severe restriction of information flow and—to some extent—a stifling of the popular culture. While it has been a boon to established authors and their heirs, as well as large publishing houses and entertainment conglomerates, the result is that the price of a given piece of creative work is inflated to several times the cost of production by virtue of the monopoly power of the copyright holder. The result—as predicted by classical economic theory—is that fewer people enjoy the work than would do so if the price of the work corresponded more closely to the cost of production.

What is needed therefore is a method for encouraging the placement of creative works outside the confines of the copyright system, in order to promote maximum distribution of such works. This invention meets that need by providing a method for encouraging creators and intellectual property right holders to give up some or all of their copyright rights in exchange for consideration that can be provided by a user of this invention, or by the public.

This invention is enabled by the current art of computer programming and hardware design, which permits a computer programmer and engineer of ordinary skill to perform the programming steps necessary to implement this invention with reference to this description and the accompanying drawings.

OBJECTS AND SUMMARY OF THE INVENTION

The following features are present in some but not necessarily all embodiments of the invention. The scope of some embodiments of the invention is as set forth in the appended claims.

A feature of an embodiment of the invention is to provide a means for relatively unknown creators to gain public recognition for their work.

Another feature of an embodiment of the invention is to increase the amount of contemporary creative work in the public domain.

Another feature of an embodiment of the invention is to provide a means for giving the public inexpensive access to contemporary creative works.

Another feature of an embodiment of the invention is to facilitate charitable donation of creative works to the public domain.

Another feature of an embodiment of the invention is to promote widespread distribution of worthwhile contemporary creative works.

Another feature of an embodiment of the invention is to create a forum for giving feedback to unknown creators for their work.

Another feature of an embodiment of the invention is to provide authors and artists a means of preserving name-recognition even while their books are out of print.

Another feature of an embodiment of the invention is to promote availability of works that would otherwise be out of print and unavailable to the public because of the copyright laws.

In summary, the invention relates to a method of providing a centralized locus—preferably on the world wide web—for effectuating transfers of part or all of the copyright in creative works to the public domain, including the steps of providing an incentive for the transfer, facilitating the transfer, and providing means for accessing the work to the general public. In a preferred embodiment, the further step of rating the work is also provided.

More specifically, an embodiment of the invention comprises a method of increasing the distribution of a creative work or providing an incentive for creating a work comprising (a) providing a site on a computer network for providing access to creative works; (b) inducing a rightholder to relinquish a subset of her rights in a creative work; (c) providing means for storing the creative work in a manner accessible to a user visiting the site; and (d) providing access to the creative work to a user visiting said site.

The step of inducing the rightholder to relinquish a subset of her rights can comprise asking for a donation of a subset of the rightholders' right or offering consideration for the right. In one embodiment of the invention, consideration is raised by putting the copyrighted work up for "cooperative auction", where the rightholder names the price at which she will part with the right within a specified period of time, and members of the public contribute to a pool of funds over the specified period of time. In this embodiment, if the amount of money in the pool matches or exceeds the rightholder's price within the allotted time period, the rightholder transfers the right to the public domain in exchange for the money in the pool. If the amount of money in the pool does not meet the rightholder's price before the closing date specified by the rightholder, any money put in the pool can be either returned to the contributor, or placed into an account controlled by the contributor to be applied in a subsequent auction.

The invention also comprises inducing a person to create an audio performance of a public domain written work, and to transfer rights in the audio performance to the public domain. The inducement to create and transfer the work can comprise the promise of making the work available on the world wide web for a period of time if the work exceeds a certain threshold of quality. The inducement can also include providing the opportunity to auction the work to the public, as described above.

In the case of the donation of an audio performance of a work, the invention includes software for checking the accuracy of the audio performance. Such software can also be used in applications independent of donation of audio performances.

Additionally, the invention provides a mechanism for temporary transfers of rights to the public domain, where the temporary nature of such transfer is either express or de facto. In these embodiments, rights are transferred from the rightholder to a third party, which binds itself not to enforce those rights for a specified period. Although the creative work is not technically in the public domain, in that (for a copyrighted work) the copyright still exists, the public can enjoy the use of the work without fear of being held liable for copyright infringement. During the "uncopyrighted" period, the works may enjoy a period of wide distribution, but at the end of the specified period, the rights revert to either the original rightholder, or to a transferee.

Further, the invention embraces the use of licenses, along the lines of the GNU (GNU, not Unix) GPL or LGPL (General Public License or Lesser General Public License) licenses, the BSD (Berkeley Software Distribution) license or the EFF (Electronic Frontier Foundation) open source audio license, for effectuating transfers of rights in creative works. Thus, authors can place works under such licenses in exchange for consideration according to the invention.

Also, according to the present invention, a device comprising means for effectuating the method of the present invention is provided. Further according to the present invention, computer-readable memory encoded with a program directing the computer system to effectuate the method of the present invention is also provided.

Additional features of embodiments of the invention are set forth in part in the description that follows, and in part are obvious from the description, or may be learned by practice of the invention. Some of the features of the invention may also be realized and attained by means of the instrumentalities and combinations particularly pointed out in the appended claims.

BRIEF DESCRIPTION OF THE DRAWINGS

The accompanying drawings, which are incorporated in and constitute part of the specification, illustrate embodiments of the invention, and, together with the description, serve to explain the principles of the present invention. In the drawings, like reference numbers indicate identical or functionally similar elements. Additionally, the left-most digit(s) of a reference number identifies the drawing in which the reference number first appears.

DEFINITIONS

Figure 1:
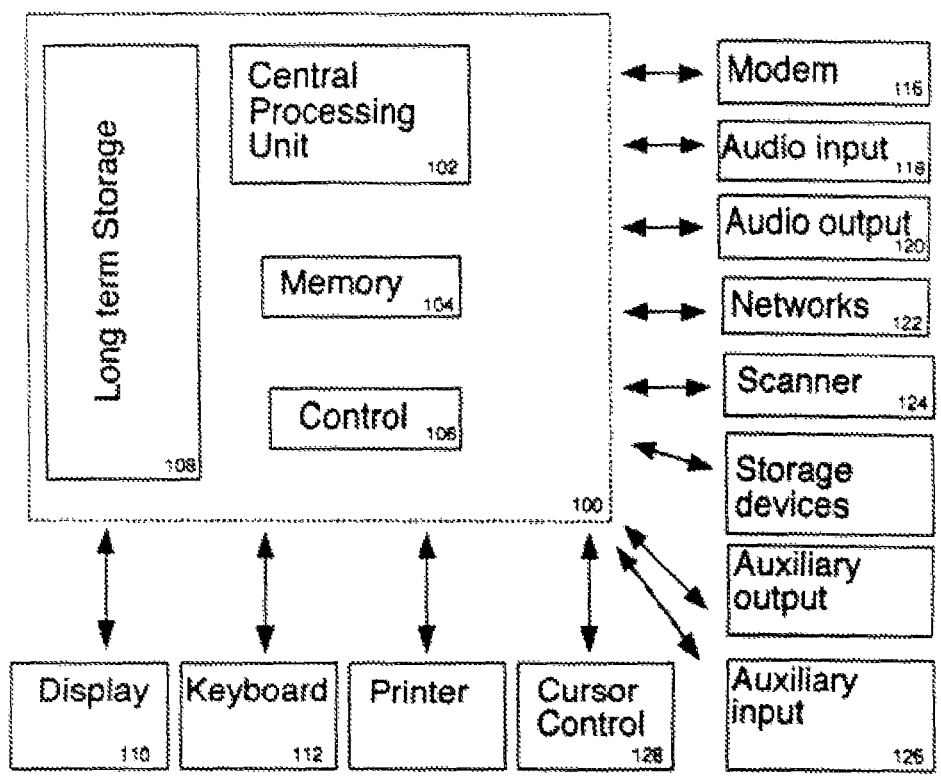
FIG. 1 is a block diagram of a computer system as may be used to implement an embodiment of the invention.

"Cooperative auction," or "auction," as used herein, comprises the concept of accepting a plurality of bids (or pledges) that are aggregated in order to purchase something. Usually, but not always, this means meeting a seller's asking price. In some cases, the auction can be held without notifying the owner or rightholder of the item sought to be purchased until an amount of money (in pledges) is obtained that is judged to be an appropriate value for the item. It should be recognized that this use of the term "auction" departs from the normal usage, where bidders typically if not invariably are in competition with each other.

"Computer" means any machine having the capability of automatically processing information. "Computer" is therefore not limited to personal computers, as are in common use at the time of this filing, and also includes machines that may supersede or supplement personal computers, hand-held computers, televisions, and telephones, by (for example) combining the processing ability and memory of computers, with the user interface of (for example) a television.

"He," "him," and "his" mean "he or she," "him or her," and "his or her."

"Creator" refers to any person who creates a work in which it is possible to obtain intellectual property protection. Such creators include but are not limited to writers, artists, photographers, movie producers, directors, actors, architects, musicians, poets, songwriters, singers, dancers, composers, choreographers, computer programmers, and inventors.

"Author" as used herein, is synonymous with "creator."

"Creative work" includes any work created by a creator.

"Intellectual property rightholder," or "rightholder" includes the holder of any intellectual property right in a work, including copyright, patent, trademark, trade secret, or a form of sui generis protection.

"Cause," as used in the claims, can refer to any outcome that benefits a group. A cause can include, but is not limited to, inducing an intellectual property rightholder to relinquish a portion of his intellectual property rights.

"Pledge" is the amount of money or value pledged by an individual bidder in a cooperative auction. The word "bid" may be used interchangeably with "pledge" in this specification. A "live pledge" is a pledge that has not expired and thus has not been returned to the bidder.

"Extinguishment" as in the phrase "extinguishment of an intellectual property right," can refer to any action that enables a member of the public to make use of the creative work that is the subject of the intellectual property right without fear of being sued under intellectual property laws. The term "extinguishment" thus can include relinquishment of some or all intellectual property rights in a creative work.

"Pledge Pool" ("PP") refers to the aggregate amount of money in live pledges that may be available to purchase an auctioned intellectual property right pursuant to an embodiment of the present invention. PP is typically a numerical value that may be calculated by a bid aggregator or pledge aggregator.

"Provider" typically refers to the entity that owns and operates the web-site in an Internet embodiment of the invention.

"Public Domain" includes anything eligible for intellectual property protection which is in fact not protected by intellectual property, including art, literature, music, and technology. The former three would traditionally be protected by copyright; the latter by patent or trade secret law.

"Video" refers to any work involving moving pictures, and includes but is not limited to works that are fixed on videotapes, DVDs, videodisks, and computer memory, and may include video games. Videos typically consist of an audio component (a "soundtrack") and a video component.

"Soundtrack" refers to the audio component of a video, regardless of how the soundtrack is obtained. In some embodiments, the soundtrack is separated from the video by software of the invention.

"Article of manufacture comprising an information storage medium encoded with a computer-readable data structure for use in connection with serving a web-site that provides the public access to creative works" includes, without limitation, a storage device of an Internet Service Provider ("ISP") used to store HTML, JAVA, or other code to provide a Web page as part of a Web site for providing the public access to creative works.

"Article of manufacture comprising a propagated signal, said signal having encoded therein machine-readable information comprising information related to a cooperative auction," refers without limitation, to an electronic signal transmitted over a telecommunications link for purposes of implementing a cooperative auction, as described in this specification. That a signal has information encoded therein should not be understood to preclude the signal from having other, further information encoded therein.

DETAILED DESCRIPTION OF EMBODIMENTS

Reference will now be made in detail to present embodiments of the invention, examples of which are illustrated in the accompanying drawings. The steps required to practice these embodiments of the invention are readily accomplished by a person of ordinary skill in the art of computer programming and hardware design, with reference to this description and the accompanying drawings.

Overview

Computer System

The invention is described in the context of a computer system (100), as pictured in FIG. 1, which consists of a Central Processing Unit (102), memory and/or storage (which may include random access short term memory [104] or long-term storage such as a hard disk or other disk drives [108]), a Control function (106), and, a display device such as a monitor (110), and one or more cursor control devices (128). In addition, such systems may contain additional means for input such as a keyboard (112), auxiliary input and storage devices (126), including scanners (124), audio input such as a microphone (118), audio output such as amplified loudspeakers (120), and access to other computer systems, including the Internet, via modem (116) or networks (122) (including wireless connections). The various embodiments are described in the context of a computer system which is capable of running programs in a Windows® environment. In a preferred embodiment, the computer system comprises a server configured to serve content over the Internet.

Method Overview—Inducement Step

Figure 2:
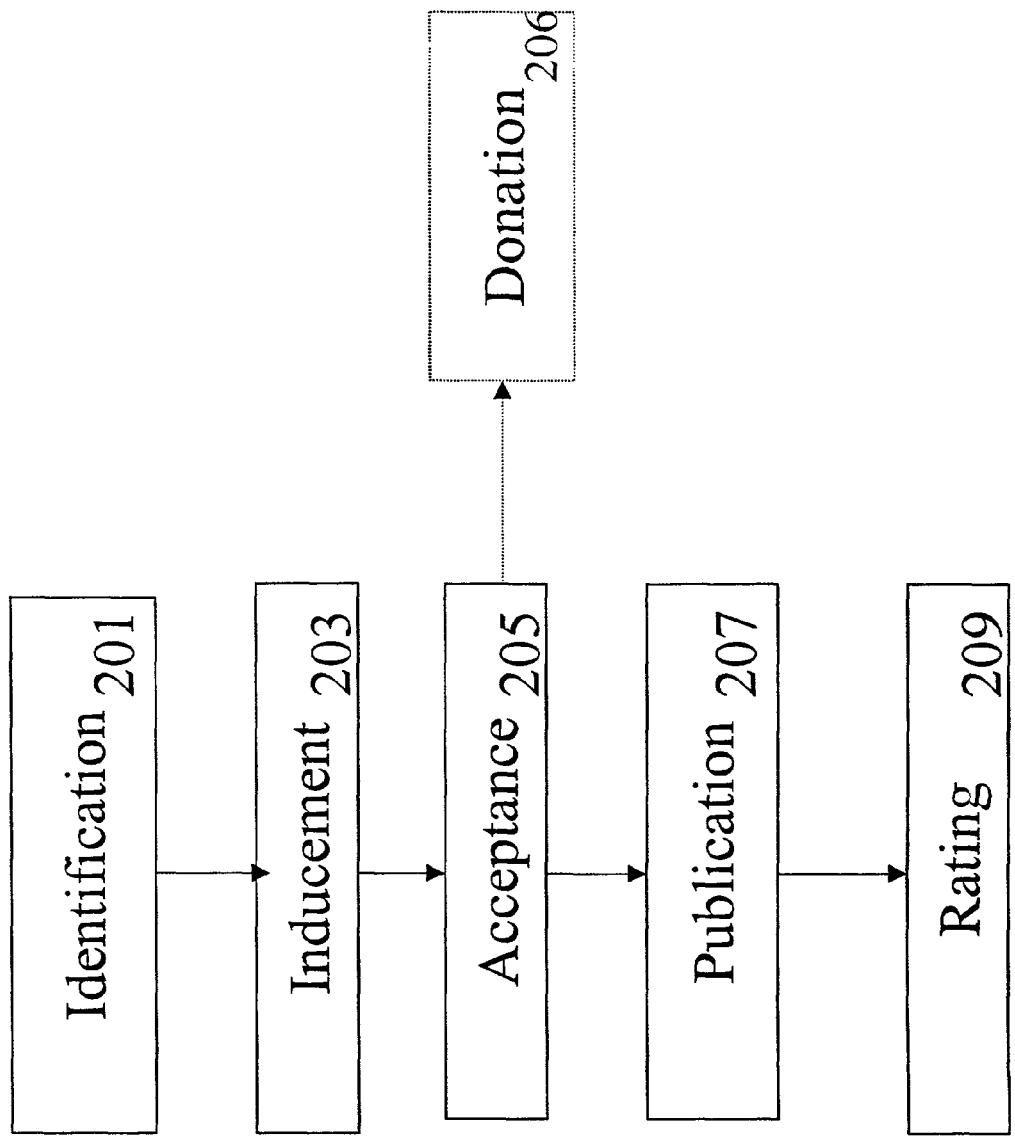
FIG. 2 presents a flow diagram of a system of an embodiment of the invention for obtaining and transferring rights in intellectual property to the public domain.

As shown in FIG. 2, a method according to the present invention includes the step 201 of identifying a creative work protected by an intellectual property regime, which would provide a benefit to the public if the rightholder could be induced to part with some or all of the intellectual property rights in it. Such works may be identified by word-of-mouth, or by consultation with experts in the field of (for example) child development and early learning. In an embodiment, rightholders are afforded the opportunity to submit their works for consideration, in the hope that they may be offered an inducement for giving up their intellectual property rights. Step 203 comprises offering an inducement to a rightholder in such an identified work to part with some or all of his intellectual property rights in the work for the benefit of the public. The inducement can be monetary, in which case the transfer of rights is less a "donation" than a sale. On the other hand, the inducement may be as insubstantial as an argument, or an appeal to the rightholder's sense of community. An example of such an inducement would include a letter sent to an author, suggesting a donation of some or all of his rights in some of his work, and explaining that such a donation will result in a broader dissemination of the author's work than he could have hoped for under the copyright system. The argument could also suggest that the contribution of such rights would be tax deductible, if that were indeed the case. An inducement could also include shares of stock in the business venture that promotes the web-site from which the works will ultimately be accessible.

In some embodiments, the inducement is merely a notice on a web-site to the effect that the web-site will accept donations of part or all of copyrights in given works (or donations of works that have not been copyrighted). In these embodiments, the inducement and identification steps are essentially collapsed into a single step.

In an embodiment, the inducement includes providing the would-be donor the opportunity to choose the extent of the rights donated, and provides the necessary legal forms to facilitate the donation of the intended portion of rights. As is known in the art, such forms can be made binding on the donor. Appropriate forms can easily be created by persons with ordinary skill in the legal profession, for example, based on licenses already in use in the open-source area, such as GNU GPL, GNU LGPL, BSD, and EFF open source audio licenses, the current versions of which are incorporated herein by reference. The transfer may involve a transfer of the complete copyright, or some portion of the copyright, such as the electronic distribution rights. Thus, an author might retain the right to publish hard copies of the work, while allowing digital copies to be distributed around the Internet.

The author may also reserve to himself or his licensees the ability to modify the work or to create derivative works from the work. Alternatively, as in the EFF open source audio license, the copyright is not transferred, but users of the work agree to be bound by a license that requires them to (e.g.) give credit to the author of the work.

In a preferred embodiment, electronic versions of a donated work contain a digital signature or digital watermark documenting the author or rightholder's release of rights. Preferably, such a digital signature or watermark provides the reader assurance that 1) the creator or owner of the copyright in the work has donated at least a portion of the rights in the work to the public domain, and 2) the version of the work that the reader has before her is complete and unaltered from the original work. Methods for applying digital signatures and watermarks are well-known to those with skill in the art.

While it is preferred to have an independent document signed by the copyright owner establishing the extent to which the copyright owner has abandoned his or her copyright rights, it is also possible to effect a donation to the public domain merely by placing appropriate language on the document itself, such as "I abandon all my copyright rights to the public domain." While donations to the public domain of the latter variety are within the scope of some aspects of this invention, the absence of a document signed by the author can lead to verification issues, especially where the author is deceased, and can also be a source of "fraudulent" donations where a third party inserts this language on to an existing work without the author's knowledge or permission.

Hence, use of a digital watermark or signature containing a certification by the author can help alleviate concerns about incomplete or inaccurate information concerning the rights in the work. Alternatively, or in addition, a third party or the web-site itself can become a recognized certification authority for these purposes, such that a certification (by digital watermark or otherwise) by the third party or the web-site constitutes strong assurance that the author has indeed relinquished a specified right.

Termination Rights

It is recognized that 17 USC §203 purports to provide authors with the inalienable right to terminate an assignment of a copyright at a specified time, for certain works. The question whether a copyright that has been effectively donated to the public domain through a GPL-type license or an express statement of abandonment can be reclaimed in toto by the original author is an unsettled question of law. The invention comprises the use of a license that expressly contemplates that the creator is legally able to terminate the assignment at the point in time specified by 17 U.S.C. §203, as well as a license that purports to relinquish all of the author's rights, including in the reversionary term. In the former case, copies could be legally made without fear of copyright issues until the rights return to the author. Derivative works created during the period that the license was in effect would presumably be governed by the terms of the license. In the latter case, given the uncertainty of the law, individuals would be well-advised not to place complete reliance on an author's relinquishment of rights in the reversionary term.

Form License

In a preferred embodiment, a form license providing a plurality of choices that determine the scope of the license is provided. The license can be accessed directly on the web-site of this invention (and in one embodiment would be freely available for copying and posting on the Internet), or could be created based on a series of questions and answers provided by the web-site to a would-be donor of a copyrighted work.

Readings of Public Domain Texts

In some cases, such as the specific embodiment of soliciting donations of readings of public domain texts (discussed in more detail in connection with FIGS. 6-7 below), the opportunity to donate the work to the web-site of this invention will provide all the incentive needed to generate the work in the first place. Thus, an out-of-work actor looking to enhance his reputation may record and contribute a reading of a short story (or, if he has time on his hands, a novel), solely for the purpose of having it posted on the web-site, in the hopes that favorable reviews will enhance his reputation, and thus increase his chances at finding employment in the acting profession.

Transfer of Rights

At 205, the assignment of selected rights in the creator's work are transferred from the creator to the provider (and are thus "accepted" by the provider). In some embodiments, the provider, pursuant to a preexisting legal obligation to do so, transfers the rights to the public domain, as depicted by optional step 206. In other embodiments, the provider retains the rights, but makes the work available to the public pursuant to a license designed to provide widespread distribution of the works. In yet another embodiment, the original rightholder retains the rights, but (again) makes the work available to the public pursuant to a license designed to provide widespread distribution of the works. Such licenses can be easily crafted by those with skill in the legal arts, based on existing licenses that achieve substantially the same purposes (such as GPL, GNU, Copyleft, or EFF Open Source Audio).

In the case where the provider is a charitable organization (with an obligation to make creative works that it receives available to the public), a donation of rights by a rightholder to the organization may be tax deductible, depending on applicable tax laws.

In other embodiments, the rightholder transfers the rights directly to the public domain.

Providing Access

At 207 the work is "published," which typically entails being stored in a manner and location accessible to the public, typically on a web-site on the World Wide Web. While works initially would be stored on a server corresponding to the web-site of this invention, in another embodiment, peer-to-peer network file-sharing technology such as those developed by Napster and Gnutella can be used to provide even more widespread access to the works. In another embodiment, the web-site would not necessarily store the works, but would maintain a list of locations on the web of the works that have been transferred to the public pursuant to the invention.

Profit Models

The method can be used by a non-profit or a for-profit organization. In the case of a non-profit, funds for maintaining the web-site and for purchasing rights from creators might be obtained from foundations that have an interest in preserving and expanding the public domain. In the case of for-profit, revenue can be generated by advertising, affiliate relationships with other web sites (such as those that sell books), and/or charging nominal fees for downloads. In case of either non-profit or for-profit, revenue can be gained simply by soliciting donations from grateful "customers" even if there is no mandatory charge. In an auction embodiment of the invention, the web-site can retain a percentage of the proceeds as profit or as a means of covering operating expenses. In addition, in an auction embodiment, the web-site can make a profit by not paying interest on accounts and/or pledges of bidders, and retaining any earnings from the use of the money held as accounts or pledges.

Depending on the prevailing tax laws, the pledges might be tax deductible. In any event, again subject to the prevailing laws, the system could be structured so as to make the pledges (or de facto pledges) tax deductible. Thus, in some embodiments, the invention provides that the "purchaser" of the rights is a charitable organization to which contributions are normally tax deductible. In that case, the pledges would be "donated" to the charitable organization, which would in turn be bound to use them to purchase the rights in the work. Additional means of making the contributions of "bidders" tax deductible will be apparent to those with ordinary skill in practicing tax law.

In some embodiments, the bidder may elect not to have a contingent right to return of his money. Thus, rather than receiving a refund if a cooperative auction fails to result in a purchase of the auctioned work, the bidder's pledge remains in a pledge account, to be applied to a subsequent auction. The bidder is allowed to maintain control over the pledge for a specified period of time—for example, one year—during which the bidder can choose which auctioned works his bid should be applied to. By electing to make the pledge non-refundable, and yet by maintaining control in this manner, the bidder may be able to achieve the ability to deduct the pledge from taxes at the time it was pledged, and yet retain some control over how the money is used. It is preferable to give the bidder control only for a specified period, so that the pledge can be used in case the bidder abandons it. In some embodiments, refunds are not available under any circumstances, and thus all bidders get the benefit of certainty in their tax deductions, at the cost of the flexibility of a potential refund.

More generally, the cooperative auction concept (described in more detail below) is not limited to purchase of intellectual property rights, and can be implemented to raise money for any charitable cause identified by a charitable institution. Thus, a charitable institution that receives a request for funding of a specific project can put that project up for "bid" to potential charitable donors. Donors can then pledge money for a specific charitable project, and thus receive the satisfaction of having chosen exactly how their money is spent. If the charity receives enough donations to cover a given project, then the charity will fund the project with those funds. As discussed above, donors can be provided the option of getting their money back if the funding goal is not reached, or, either at the donor's election, or by mandate, the pledges are not returned to the donor, but instead are used for other projects of interest to the donor, for a specified duration.

Advertising in the context of this invention includes not only banner ads on the web-site itself, but also advertisements embedded in the works themselves. For example, a literary work may contain an advertisement that states that the work was in some way financed by, or that rights in the work were procured for the public through the efforts of, a specific organization ("i.e. brought to you by Acme Company"). In an embodiment, some or all of the advertising revenue thus generated may through to the author, thereby offsetting to some degree the potential lost profits the author could have made by retaining all of his copyright rights. In a preferred embodiment using embedded advertising, a work containing embedded advertising would also contain a digital watermark attesting to the authenticity and completeness of the work. In such cases, if the advertising is removed, the watermark is also removed, and readers of such stripped-down versions would no longer be assured that they are reading the unadulterated work.

In some embodiments, the optional step of compensating the author or rightholder (in addition to the compensation already tendered in terms of public access and enhanced name recognition) in proportion to the amount of interest in the author's work is also possible. In one embodiment, such compensation is effectuated by means of a cooperative auction, as discussed below.

Rating System

At 209, the web-site provides means for a visitor to judge whether or not she will enjoy the work. These means can comprise a rating system, wherein visitors who have access to the work have the opportunity to rate the work, including writing short reviews that may prove helpful to future visitors to the site. In one embodiment, users of the site are provided access to a reviewer's other reviews, in order to gain a clearer sense of the reviewer's tastes. In some embodiments, as an alternative or in addition to reviews, creators or rightholders are required to submit information relating to the work that helps visitors judge its quality, such as a short description of the work, a short explanation of why a reader should read the work, or a resume of the author. For performance work such as music, readings, and motion pictures, visitors have the opportunity to sample portions of the work, and thus judge for themselves whether the work is worthy of their attention. Thus, rather than rely on reader reviews or author submissions relating to a particular audio recording, a web visitor would simply listen to a portion of the work for himself, and make the judgment.

Figure 3:
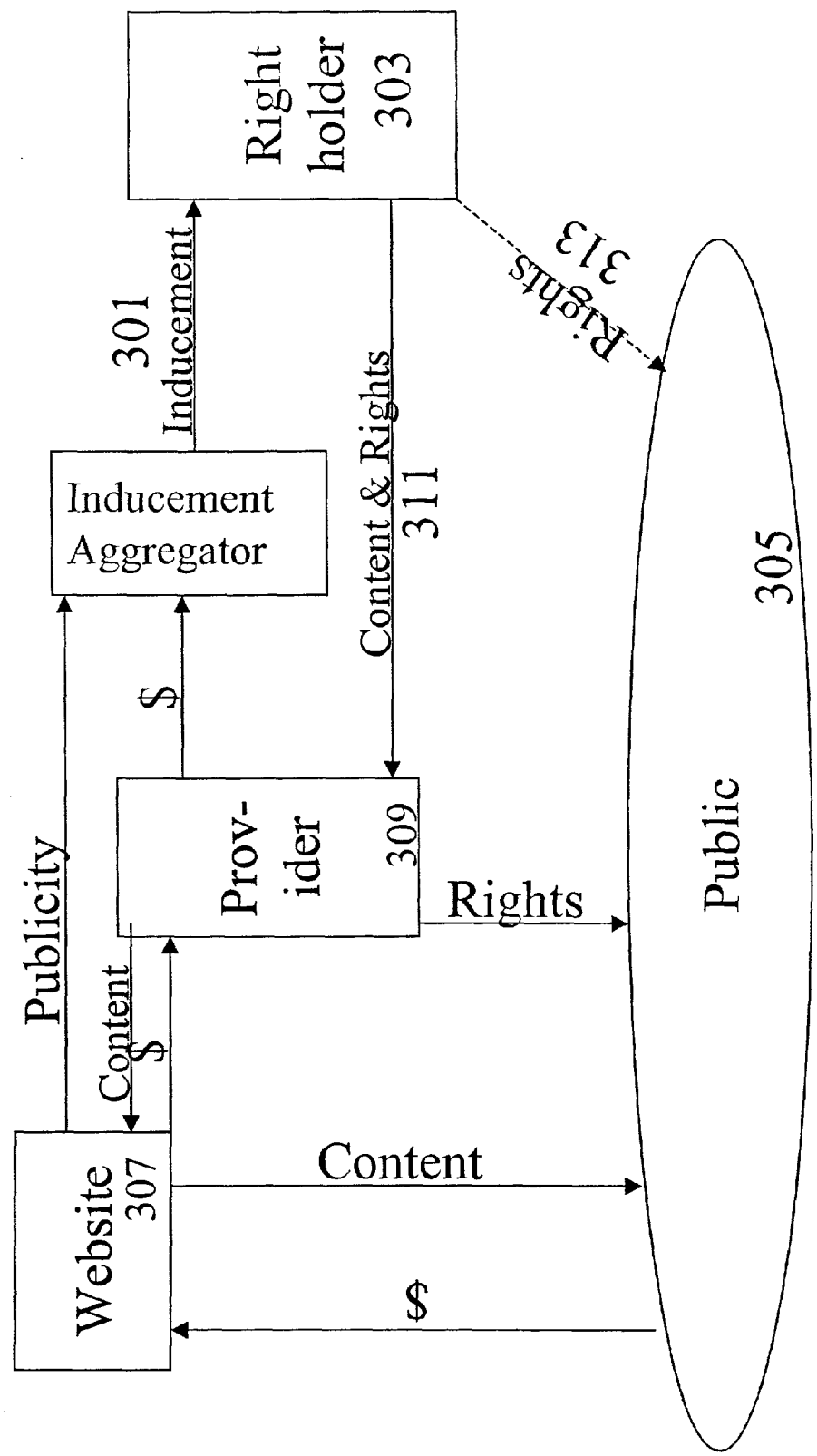
FIG. 3 provides a block diagram of a system of an embodiment of the invention for obtaining and transferring rights in intellectual property to the public domain.

FIG. 3 provides a different view of the process described in connection with FIG. 2. An inducement 301 is offered to rightholder 303. The inducement can comprise money, which may have been raised from the public 305 by web-site 307, and may also comprise favorable publicity that is generated when a work is donated and posted on web-site 3097. Provider 309 can serve as a conduit for the money raised by web-site 307, as well as for the rights and content 311 provided by rightholder 303. Alternatively, rightholder 303 can transfer rights 313 directly to the public domain.

Cooperative Auction System Embodiment

In another embodiment, the inducement is provided by a cooperative auction system. In this embodiment, an owner of a copyright is provided the ability to "auction" off some or all of his rights in the copyright in a cooperative auction. Members of the public "bid" on the work, or a subset of the author's rights in the work, such that when the aggregate bid of the public matches the price set by the copyright owner, the copyright owner donates the work, or the subset of his rights in the work, to the public domain in exchange for the money.

In one embodiment, a specific set of rules governs such an auction. Thus, the owner names his or her price, and specifies a period of time during which the work will be available at that price. Members of the public then submit binding "bids" and (in some embodiments) have the ability to specify when their "bids" expire. In other embodiments, the bidders must pledge their bids to last until the period set by the seller has expired. In an embodiment, the web-site collects all the bidding and price information, and provides an output stating 1) how much more money is needed to purchase the work for the public domain, and 2) how long it will be available. In cases where the bidders' bids are set to expire prior to the copyright owner's selected closing date, the web-site also provides this information, which will essentially show that if the work is not bought by a certain time, the price to the public will go up as bids are removed.

In one embodiment, the output is in the form of a graph of value units (such as dollars) versus time, where the value units are on the y-axis, and time is on the x-axis. In such an embodiment, (1) the seller's price is indicated as a horizontal line at the level of value units that the seller has set the price, (2) the time at which the price expires indicated as a vertical line intersecting the point along the x-axis corresponding to the seller's stated expiration time, and (3) the "pledge curve" is a curve, in some embodiments continuously updated, that shows how the amount of value units in the pledge pool varies over time. At any given time before the expiration, a user can view exactly how many value units are needed to buy the work (by observing the vertical difference between the horizontal "price" line and the "pledge curve," and also can look at a projected pledge curve, which dips vertically every time that a pledge is set to expire.

As a simple example, consider the case where the copyright owner has agreed to sell his copyright for $1000, and has agreed that the copyright will be available at this price for 30 days. Consider bidders A, B, C, D, E-J. On day 1, Bidder A bids $250, and agrees that this bid will remain binding on him for the full 30 days. Bidder B bids $400, but specifies that this bid expires on day 20. Bidder C bids $100, but specifies that the bid will remain available until day 10. On day 9, bidder D is considering what to bid. D realizes that the total bids through day 10 are $750, and that by committing $250 before the end of day 10 will result in the work being placed in the public domain. On the other hand, after day 10, there will still be a total of $650 in the pot through day 20. In this example, bidder D feels that he cannot afford the full $250, and bids $100 to functionally replace bidder C's bid, and thus leave the necessary payment at $250 for 10 more days. In this case, bidder C will have accomplished a certain purpose, and may even reenter the bidding (at this point, the price to bidder C for placing the work in the public domain will be $250 rather than the $350 it was when he submitted his first bid). Assuming C renews his $100 bid, and bidders E-J might make nominal contributions of $10 each, the price on day 20 will be down to $90. Hopefully this will be met, either by a single bidder, or by an aggregation of smaller bidders throughout the course of the day. Even one of the original bidders may decide to increase his bid to ensure that the purchase is made.

As an added incentive to the bidding, the bidders could have their names permanently associated with the work, for example by means of a digital certificate that also attests to the completeness and authenticity of the work. For corporate donors, the advertising value of having contributed to the purchase and donation of a work to the public domain may well provide a return in excess of the cost. For copyrighted works where the work is visual, the list of donors—or advertising of products of the donor—can be displayed as part of any digital copy of the work.

In a preferred embodiment, the web-site provides visitors the option of signing up for an e-mail service that apprises them of works that are going up for "auction", as well as the status of ongoing auctions.

For auctions where the rightholder's price is not met within the specified time, the money collected from bidders may be returned to the bidders, or placed in an account for the bidders for application to a subsequently auctioned work.

As already mentioned, in one embodiment, the pledge is a conditional commitment to make a donation to a charitable organization. If the seller's price is met by the pledge pool, then the bidders' pledges are all transferred to the charitable organization, and the bidders are able to claim any advantage that the tax system allows. The charitable organization is then bound (for example, by its organizational charter or by-laws) to use the donated money to purchase the work for which the donated money was earmarked. As mentioned above, in order to ensure tax deductibility as of the date of the pledge, in some embodiments the bidder has the ability to specify that the pledge is irrevocable. In some embodiments, bidders whose irrevocable pledges were pledged in auctions where the seller's price was not met have the option of continuing to control the use of the pledge money in subsequent auctions for a subsequent period of time, such as a year.

The cooperative auction system can be used for patents as well as for copyrights. Thus, if a patent is put up for auction, and the patent owner's price is met, the patent owner relinquishes his rights in the patent, either by filing a terminal disclaimer dedicating the remaining patent term to the public domain, or by failing to pay further maintenance fees.

Figure 4:
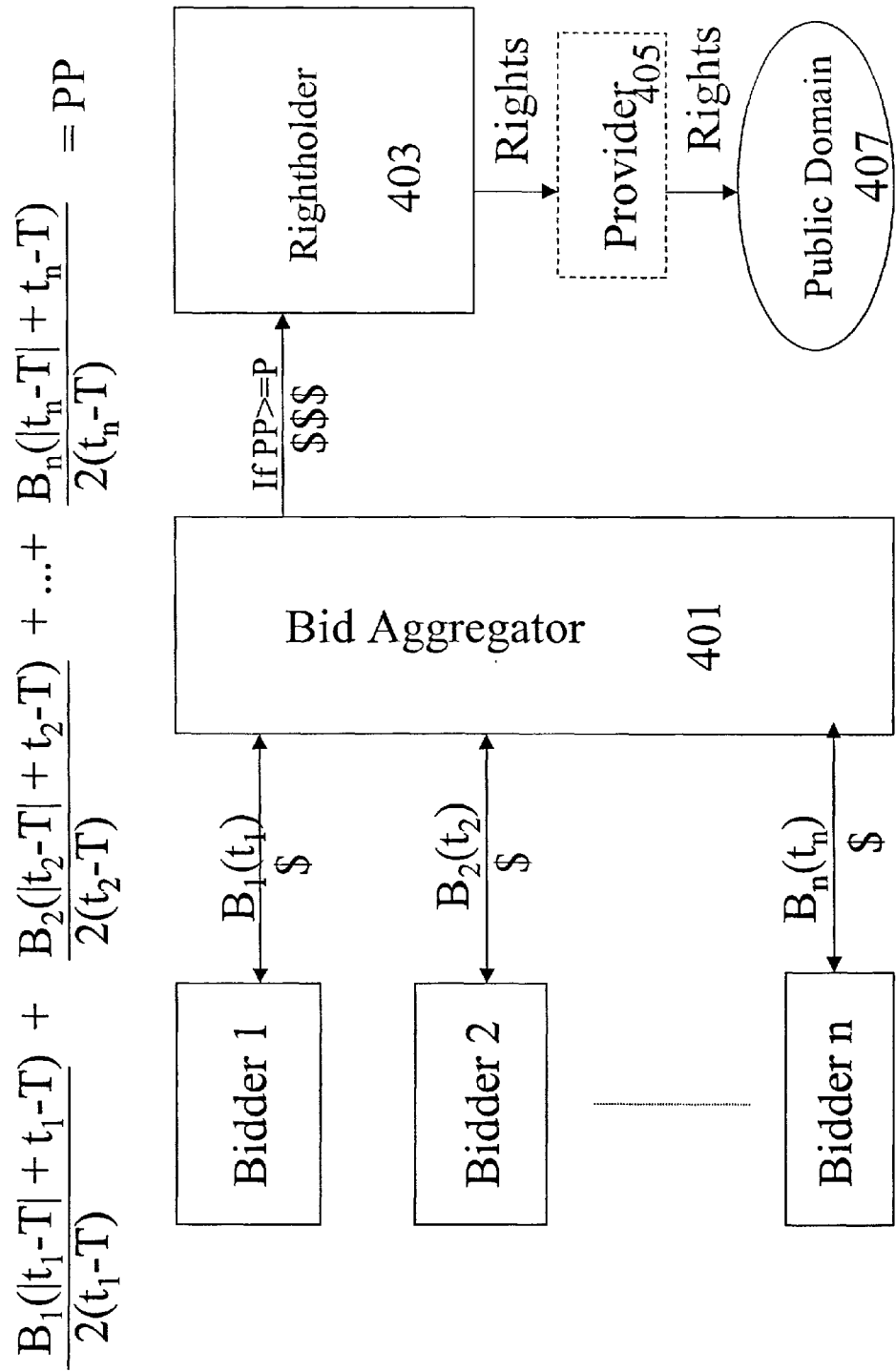
FIG. 4 presents a block diagram of a cooperative auction method according to an embodiment of the invention.

As shown in FIG. 4, the pledges of Bidders 1-n (i.e. 1 through n) are aggregated in the common pledge pool (bid aggregator 401) to the extent that they (the pledges) have not expired. If a pledge has expired, then the money is returned to the bidder who made that pledge. The steps of setting up a pledge account, accepting money from a bidder (by means of a credit card, debit card, or a form of electronic cash such as that provided by PayPal, ecash, Digicash or Millicent), and then returning that money to the user at the expiration of the pledge are easily carried out by one with skill in the art relating to e-commerce. As previously mentioned, in one embodiment, the web-site profits by not paying interest on the pledge accounts.

More specifically, referring to FIG. 4, assume the rightholder 403 sets his price (P) and the time for expiration of the auction ($T_{end}$, not depicted). A bidder places a sum of money in a pledge account. In the pledge account, the bidder no longer has control over the money, such that he has no legal right to a return of the money if the transaction between the seller and the public is effectuated. Nevertheless, if $T_{end}$ (or, in an embodiment where the bidder can set an expiration time on his bid, $t_i$) is reached without the sales price having been met, then the bidder has a right to his money back, in a preferred embodiment pursuant to the terms of a contract between the provider and the bidder. The potential flow of the bid to the bid aggregator, and back to the bidder, is indicated on FIG. 4 by bi-directional arrows. It will be readily apparent to one with skill in the relevant legal arts how to accomplish such a resurrection of the bidder's rights in his pledge money.

The embodiment described in the previous paragraph is illustrated in FIG. 4 as follows. Each bidder i submits a bid $B_i$, which is specified by the bidder to be valid through time $t_i$. At time $t_i$, if the transaction has not been consummated, bid $B_i$ is returned to bidder i. In the depicted embodiment, bid aggregator 401 aggregates the bids pursuant to the summation shown in FIG. 4:

$$\frac{B_1(|t_1 - T| + t_1 - T)}{2(t_1 - T)} + \frac{B_2(|t_2 - T| + t_2 - T)}{2(t_2 - T)} + \ldots + \frac{B_n(|t_n - T| + t_n - T)}{2(t_n - T)}$$

This summation counts only those bids that have not expired. Thus, for example, if the time (T) at which the summation is made occurs after time $t_1$, the time at which Bidder 1's bid $B_1$ expires, then the first term of the equation is zero (since $t_1-T$ is a negative number, which, when subtracted from its absolute value in the numerator, causes the first term of the summation to equal 0). On the other hand, for any unexpired bids—where $t_i$ is greater than T—the t and T terms in the numerator and the denominator are equal (i.e. $(|t_i-T|+t_i-T)=2(t_i-T)$), so the full amount of the bid $B_i$ is counted by the aggregator. In some embodiments, the aggregator makes the calculation on a regular basis, and if the summation ever exceeds the price P set by rightholder 403, then the transaction is effectuated, in a preferred embodiment pursuant to a contract between the rightholder and the provider specifying that under these conditions, the rightholder must transfer his right to the provider (or the public domain) in exchange for the price P collected from the bidders' unexpired pledge accounts. If time $T=T_{end}$ arrives without the summation ever having equaled or exceeded P, then the pledges may be returned to the bidders. As mentioned previously, in some embodiments, the pledges are not returned to the bidders, either by the election of the bidder, or as a rule.

In one embodiment, the user (usually, a visitor to a web-site) can see an up-to-date snapshot of the amount of money in the pledge pool (PP), as well as an indication of how much more money will be needed to meet the seller's price (P-PP), as well as an indication of upcoming losses from the cooperative pledge pool that will occur as bids expire. In another embodiment, users indicate an interest in a particular auction, or category of works, and receive emails informing them of upcoming auctions, and/or the status of ongoing auctions, including "price to buy" and "next loss to pledge pool" (i.e. when and by how much the pledge pool will be depleted as a result of expiring pledges).

At such time as the aggregate number of live bids equals or exceeds the price (i.e. PP>=P), the transfer of rights occurs. This can be accomplished by means of a contract in which the seller binds himself to transfer the rights in the work at such time as a termination condition—PP>=P—occurs. As discussed above, the transfer can be to the provider 405 (in some embodiments as a conduit) or simply to the public domain 407. It will be apparent to one with skill in the legal arts how to draft a contract that causes a transfer of such rights upon fulfillment of such a condition.

In another embodiment, the seller of the rights does not necessarily name a price, but does name a closing time ($T_{end}$). In that case, an announcement is made that the work is up for auction, and bidders make their pledges. For particularly meritorious works, a campaign may be organized to attempt to raise an amount of money substantial enough to cause the rightholder to be willing to part with his rights. In a preferred embodiment where the seller does not name a price, and the auction expires on a given day, bidders may place pledges that last until the day of expiration. In other embodiments, the bidders' pledges can remain binding on the bidders for some period of time after the expiration of the seller's offer. During that time, the seller could negotiate with the bidders, or other members of the public, over a final selling price. Thus, if an author wanted to receive $4 million for his copyright, but the web-site only raised $3.5 million on the expiration date, the author could have a week to (1) consider taking the $3.5 million, or (2) solicit additional pledges, or (3) encourage the existing pledgeholders to campaign to cover the difference. Steps (2) and (3) could be taken in combination with an agreement by the author to accept something less than $4 million.

Special Considerations for Video Works

A significant benefit of some embodiments of the invention is the creation of a store of contemporary, public domain motion pictures. As things currently stand, due to the length of the copyright term and the relatively recent emergence of motion picture technology, only a tiny percentage of motion pictures ever produced are in the public domain. Given that it is very nearly impossible to prevent children from watching videos or playing video games, it is anticipated that one significant source of public domain materials will be entertaining, educational videos and video games whose rights have been purchased and donated by charitable foundations, or by aggregations of civic-minded individuals. If such videos and video games are free, perhaps they will be preferentially used by parents as the videos of choice for their children.

The absence of copyright protection—or limitations on copyright protection—make it possible for users to create derivative works without infringing a copyright, using software of an embodiment of this invention. In the area of videos, and especially animated videos, this is a great benefit, as users will be able to 1) make translations of animated videos (which may themselves be uncopyrighted), 2) create their own voice-overs for animated videos, for example, with each member of the family (or a class in an elementary or high school) playing a different character in the video. Under the current copyright system, such modifications of existing works would be considered derivative works, and thus copyright infringement if not authorized. Moreover, as a consequence of the need to protect against unauthorized copying, current digitized motion picture presentation technology—such as DVDs—does not permit a user to easily modify or add to the digitized content, due to (1) encryption of the digitized content, and (2) copyright laws against circumventing such encryption.

As will be seen, the ability to create derivative works with impunity can transform works that were never intended to be educational (and thus can be highly entertaining) into educational tools. One example (of many) of videos that would produce far greater value to the public as public domain materials than they currently do for their rightsholders are animated Shakespeare plays. The fact that public domain "transcripts" of such plays exist in foreign languages eliminates the need for a separate translation step.

The ability to insert one's own voice or voices for some or all of the characters in a video is provided by technology known in the art of voiceover dubbing technology, and software programs exist to make this task easier. However, the use of such software programs is typically restricted to the original copyright holder or a licensee, since any manipulation of a copyrighted work would in most cases constitute an infringement. Thus, such programs have not seen widespread use, except perhaps in the area of digital home movies.

An embodiment of the current invention uses voiceover dubbing software technology to enable a user with access to the script of the soundtrack of a motion picture to edit the soundtrack to have his voice replace that of the character whose voice was deleted. More specifically, one embodiment of such a computer program presents the user with 1) the script of the soundtrack, 2) the video portion of the motion picture, and 3) an indication of how quickly the user must say the lines. The indication can take the form of a cursor, or other means of indicating progression (such as progressive highlighting or bolding), to indicate where on the script the original voice was reading. Thus, a user will see and hear the line spoken by the character immediately preceding his line, and then will have the text for his line, along with an indication of how quickly the line must be read, presented to him. He then speaks the line into a microphone connected to the computer, and the line is then inserted in an audio file containing the modified version of soundtrack.

In another embodiment, the speaker hears the actual line that he is to say, and then merely repeats it. In one embodiment, the digitized video is stored on the user's computer system. The digitized video may be pre-marked, in some embodiments by means including time encoding, such that any character of interest is "marked" in a manner that enables a user to retrieve just the lines of that character, or just the lines of that character plus a brief period of the surrounding time. Thus, the user can choose to hear only the lines of character X. In one embodiment of the invention, the user is presented with a computer screen that comprises (1) an area for showing clips of the motion picture, and (2) an area for providing the text of the lines, and (3) a signaling mechanism that enables the user to signal the computer system to initiate recording of a line. Thus, a user using this system will observe the character of interest recite a line on the screen. The user then can select "record" and then repeat the line. The user-repeated line is recorded, and is used to replace the original line using technology and/or techniques well known in the art.

In some embodiments, the invention converts the motion picture from its original format (any of various possible analog or digital formats), into a Motion Picture Expert Group (MPEG) file, as is known to those with skill in the relevant art. The MPEG file can then be parsed to separate the audio and video components, where the audio components constitute the digital soundtracks discussed above, and below.

Language Learning

Yet another advantage of public domain videos is the ability to insert subtitles into the videos in accordance with an embodiment of the invention without fear of being accused of infringing a copyright. A video—such as an animated video—for which a foreign-language voice version has been made, combined with subtitles, can provide a powerful tool for learning a foreign language. An English-speaking family seeking to learn Spanish might have one copy of a video with the voices in English, with Spanish subtitles, and another copy of the same video with the voices in Spanish. After the first few viewings of the video in English, the users will be familiar enough with the lines to either start focusing on the subtitles in an attempt to learn Spanish, or to switch to the Spanish video. With enough viewing of the videos, and with use of the subtitles, and (optionally) supplementary materials, users will easily and painlessly learn foreign languages. The language-learning component can make even videos targeted at younger children interesting for older children or adults, who are often forced to watch the video with the younger children. For younger children learning how to read, the addition of English subtitles in a video with English voices can be beneficial.

In one embodiment, a computer program can "parse" one or more motion pictures and/or their soundtracks to automatically create a database of foreign language sentences, where each sentence is categorized according to its content, usually in several categories. Thus, in one embodiment a sentence such as "I see that you hate pickles" would automatically fall under categories for the words "see", "hate" and "pickle". Thus, the sentence might appear in a training tool along with other sentences from this or other movies involving the word "pickle" (as part of a vocabulary building exercise), or it might appear with other sentences showing conjugations of verbs in the first person (where the other verbs conjugated may or may not be "to see") or the second person (where the other verbs may or may not be "to hate"). The text presented along with the movie could be in the same language as that spoken by the character, or it could be a translation.

In another embodiment, rather than provide complete translations of what is being said by the characters, the software can be set to provide simply a key word, and its translation. Thus, as the character is speaking the words "I see that you hate pickles", the screen display might consist of "pickles=gurken". The next time the line is shown, perhaps a different word from the sentence would appear with its translation.

The invention is also useful for any individual attempting to build his vocabulary. Given a database of videos, as well as their corresponding scripts (which can in some cases be created by voice recognition technology), someone wishing to learn a list of vocabulary words could simply feed the list into the computer program, and receive as output "links" to video clips in which the words were used. Obviously, the easier the vocabulary list, and the more extensive the library, the more likely that all words will be found in the library.

The uncopyrighted nature of motion pictures that enter the public domain can be capitalized on by a computer program that enables a user to edit such a work, or that automatically edits the work or extracts portions of the work pursuant to a user's wishes. As an example, consider a user in possession of a German and an English version of the same motion picture, or a person in possession of the video of a motion picture, along with a German soundtrack and an English soundtrack of the motion picture. The soundtracks and video are accessible by the user's computer, e.g. on its hard drive.

As computers "converge" with TVs, and the devices that are watched for entertainment purposes increasingly have computer processing ability and memory, the user will increasingly be viewing the movies on the same device on which they are stored. In one embodiment of the invention, a computer program can use voice recognition technology to identify the distinct voices of the main characters of a given movie. The program thus can associate a unique identifier with each character in the movie, and can also determine and record the time at which each character delivers each of its lines. In other words, if the soundtrack of a 95 minute movie is seen as a 95-minute long timeline, each line of each character can be seen as a line segment, with a starting time and a finishing time, on the timeline. One with ordinary skill in the arts of computer programming and of creating and manipulating time-encoded soundtracks could easily program a computer to separate the characters in this manner.

For a user having access to an English and a German version of a movie soundtrack, the individual can choose to have character 1 speak German, and the other characters speak English. One way to accomplish this is to make a copy of the English version, and then, based on the determination that the computer has made about the starting and ending times for each of character 1's lines, the program takes the lines from the German movie corresponding to those times, and uses those to replace those of the English movie corresponding to those times. Those with skill in the art will readily be able to accomplish the above-described manner of creating a hybrid movie, and other methods of creating such a movie will be readily thought of by those with skill in the art. Thus, the product of the two soundtracks and video need not even be fixed in a tangible medium, but may be created in real time in response to user input.

The two (or more) soundtracks can be mixed and matched in an infinite number of ways in order to produce an infinite number of different motion picture products. In one embodiment, the user has the ability to make choices regarding the hybrid product. Thus, for example, the user can specify that after each scene, the same scene will be replayed in a different language. Alternatively, the user may select to have each line replayed in a different language immediately after the line is first delivered. Or the user may select that only the lines of certain characters will be repeated. As already discussed, with the subtitles and these different options of when to use the foreign language, users can pick the way that they learn best. These embodiments of the invention can be readily reduced to practice to those with ordinary skill in the art of computer programming, with the aid of currently-available subtitling software technology.

In one embodiment, the computer system "indexes" a file, by a associating sequential number with each successive line, where each number is associated with a unique time-elapsed. In another embodiment, the lines are tracked by character— e.g. Hamlet 1, 2, Ophelia 1, 2, etc. Tracking the lines by character may facilitate responses by the computer to user queries that are based on specific characters (as, for example, if the computer program creates a table that associates each line of the soundtrack with a specific character).

Thus, in some embodiments, the computer program produces and/or uses a database where a line in the database includes value for time elapsed, character, and possibly line number, and possibly length (in time) of line. In these embodiments, when the user gives the go-ahead, the computer goes through each of the two soundtracks (the two different-language soundtracks of the same motion picture) and creates one table of the sort just discussed for each language. In some embodiments, the computer system compares the two tables thus created to ensure that the software has accurately assigned the lines to the characters.

In other words, file 1 will show that character 1's lines occur at starting points 0:10, 4:12, 4:34, etc. etc. If character 1 in the translation shows up with a different set of lines, these differences are presented to the user in a manner that enables the user to quickly correct the errors. Thus, if file 1 indicates that character 1 has a line at 6:18, and file 2 indicates that that line is spoken by character 2, the user is shown the clip starting at 6:18 and is offered the opportunity to correct either file in order to correct the error.

Assuming the lines match up or have been matched up by the user, the user can choose from several standard options— such as line after line, or scene-after-scene, as discussed above. In addition, the user is given the option of deciding which character will speak which language. The computer system will not necessarily know the name of the characters, but can easily present to the user a line spoken by character 1 (with the associated video), in order to enable the user to choose a character to "translate" into the other language.

In one embodiment, the device on which the user is going to view the video is directly connected to the computer system on which the user "created" his preferred video. Thus, the user watches on the computer's monitor, or on a "smart" TV. In these cases, the user does not need to copy the newly created video onto a medium that can then be played back on a TV, and, indeed, the newly created file need not be saved for any length of time, if at all—the computer program simply has instructions telling it which file to draw which "lines" from, and acts accordingly, without creating a new file.

Embodiments in which the user copies the movie onto a medium that can be replayed by a separate device—such as making a videotape from the output of a computer and playing it on a VCR—are within the scope of the invention and are easily facilitated by modern personal computers.

In one embodiment, the user has the option of selecting a percentage, for how much of the movie will be presented in each language. The user may also elect to have a movie translated progressively into another language ("progressive translation"), with an increasing percentage of the movie in the second language after each viewing. Thus, the user might specify that the first five viewings of a movie are to be in English with Spanish subtitles, and that thereafter, the sixth viewing will be 5% in Spanish with English subtitles, the seventh viewing will be 10% in Spanish with English subtitles, etc. In some embodiments, prior to viewing the video, the user is prompted to enter his name, or the names of all of the users watching that particular viewing. Thus, the computer program keeps track of which users have watched the movie how many times, and can provide the "progressive translations" based on this information.

The above-described features work with more than two files, of more than two languages as well. Thus, one could create a movie having each character speak a different language (with subtitles in the user's language of choice).

Figure 5:
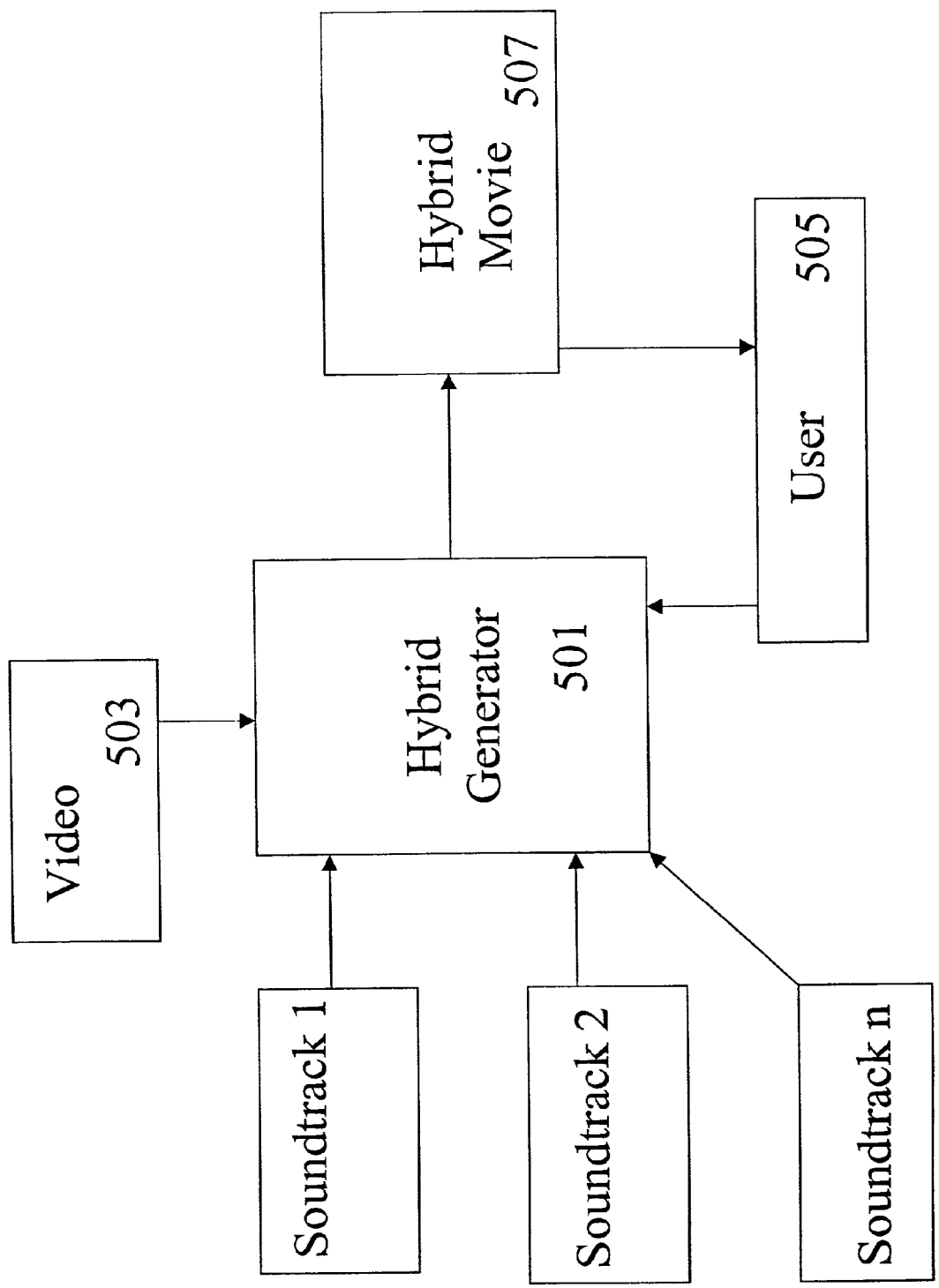
FIG. 5 presents a block diagram of a system of an embodiment of the invention for generating a hybrid video product from a video and a plurality of soundtracks.

FIG. 5 is a depiction of a system for generating a hybrid movie according to the present invention. In the embodiment depicted in FIG. 5, hybrid movie generator 501 receives input from a plurality of soundtracks that correspond to video 503. In response to input by user 505—in which the user specifies the exact nature of the hybrid movie that he is seeking to create—where the choices can include, as discussed above, the language spoken by any given character, whether there are subtitles, what language any subtitles are in for a given character, and what form the subtitles take (in that they may provide definitions of key words, rather than translations, or may even be in the same language as the soundtrack)—the hybrid movie generator 501 generates the specified hybrid movie 507. In some embodiments, the hybrid movie is generated in real-time, in that the user viewing the movie is capable of changing an option while viewing, thus altering the hybrid movie in real-time.

In some embodiments, the technology described above is used to make hybrid works from copyrighted materials as well. Thus, where the copyright laws allow such derivative works, or where the user either is the rightholder or has a license from the rightholder to create such a derivative work, the same technology can be used for copyrighted works. Thus, copyrightholders can market their content as well as software pursuant to this invention. Alternatively, copyrightholders or their licensees can create hybrids using this invention and sell the hybrids to the public. Finally, in some embodiments of the invention, copyrightholders or their licensees sell a package comprising two versions of the video in two different languages, with or without subtitles as well as supplementary materials. Thus, while in the current art movies typically run their course by first appearing in theaters, and then appearing in video stores (and on store shelves), the invention contemplates a third appearance, typically in stores or available over on-line retail outlets, wherein the video is sold as a package including a first video with a soundtrack in a first language (such as English) with subtitles in a second language (such as German), and a second video with a soundtrack in the second language (e.g. German) and subtitles in the first language (e.g. English). Such a two-video product can comprise two videos on two separate media, such as two separate video cassettes, or can comprise two videos on a single recording medium, such as a DVD, or computer memory capable of storing two videos. Such a two-video product may or may not be packaged with supplementary materials, which may include vocabulary lists and/or grammatical instruction. In another embodiment, the video can be stored on a medium that allows the viewer to choose the language for the subtitles; thus, an individual wishing to learn written as well as spoken German may wish to view German subtitles for a German soundtrack. In another embodiment, the video can be stored in a medium that allows for "progressive translation" as described above, of the copyrighted work.

In addition, using the principles of this invention as it applies to uncopyrighted works, a rightholder who owns the rights to several movies could construct derivative works based on those movies where lines from different movies can be used to emphasize similar vocabulary words, or grammatical concepts. While the copyrightholder (because of its fear of unauthorized copying of whole videos) would likely not be able or willing to provide the user the flexibility to create a hybrid video exactly according to the user's wishes, the hybrid works created from copyrighted works could nevertheless constitute valuable instructional materials.

Public Domain Readings

Figure 6:
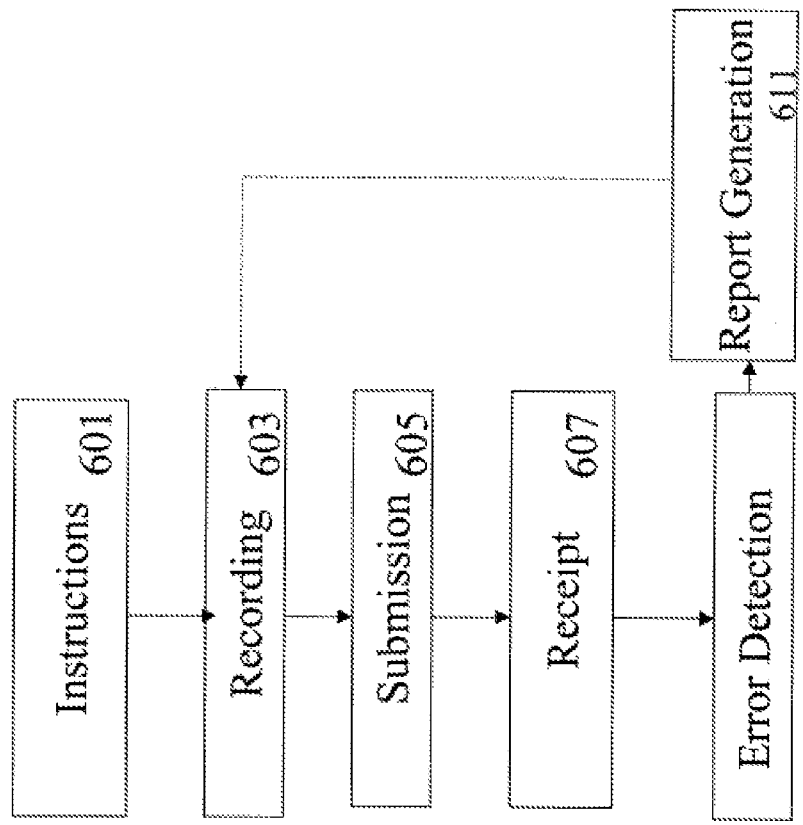
FIG. 6 shows a flow diagram of an error checking method for audio performances according to an embodiment of the present invention.

One area that is particularly well-suited for practicing the principles of this invention is the creation of audio-performances of public domain literary works. FIG. 6 is a block diagram showing a specific embodiment of the invention for receiving an audio recording of a work. At 601, the web-site provides instructions for submitting an audio work. For example, the web-site can provide useful information on how a person working at home can create a high quality audio recording, including recommendations of equipment, as well as technique. The web-site can also provide information about recording the work at a recording studio. The instructions also provide discussion of how the work is to be submitted; whether the web-site will accept submissions that are transmitted over the web (including the format of the transmission) or those that are recorded on some tangible medium and then delivered (e.g. by mail) to the web-site.

In a preferred embodiment, the web-site need not provide any inducement beyond an appeal to a potential creator's vanity and desire to achieve name-recognition to induce donation of audio performance. Nevertheless, in some cases, inducements may be made. Such inducements could include monetary compensation, or, as discussed above, the ability to sell the work to the public domain in a cooperative auction. More elaborate inducements used in some embodiments include contests, dating services, and high school reading competitions. In a contest embodiment, the web-site invites submissions of works, with the promise that the winner—as chosen either by a panel of distinguished judges, or by visitors to the web-site—will receive a cash prize, and runners up and losers will nevertheless potentially obtain the satisfaction of having their work made available on the world wide web.

In the dating service example, one component of a dating service profile is the reading of a public domain work. This gives would-be dating prospects a further criterion on which to judge their potential date, and would also increase the store of audio performances of public domain works. In the high school competition embodiment, high schools submit samples, e.g. of public domain plays, that would then be judged (hence a competition) and then posted for posterity on the web-site.

In one embodiment, the work to be recorded is a public domain work selected by the web-site itself, or chosen by the artist from a list of possible selections (which, optionally, change every month, or as suitable recordings are received by the web-site). One category of works that is particularly suitable for listing is public domain works that appear on high school reading lists. The availability of free, public domain audio performances of these works may enhance the high schools students' appreciation of these works.

The text of the work is thus available to the reader, for example, electronically (in which case it may be provided by the web-site), or in hard copy form. In another embodiment, a reader may select a work on his or her own and submit it to the web-site for consideration and possible posting.

At 603, the reader records his audio performance of the work. In one embodiment, the reader uses reading technology, such as that described in copending patent application Ser. No. 09/628,729 ("Improved Teleprompter Device"), filed Jul. 28, 2000, the specification of which is incorporated herein by reference, to ensure seamless reading aloud of the electronic version of the work. Thus, the text displayed to the reader advances in accordance with the speed at which the reader is reading aloud. Further, the software determines whether the reader has accurately read the material in the electronic text, and provides a real time visual or audio signal to the reader in the event the software detects a difference between the word spoken and the text itself. The voice recognition technology required for this embodiment of the invention is well known to those with ordinary skill in the art.

One method for creating an audio recording for submitting to a web site is to speak directly into a microphone connected to the computer, and to thereby create an audio-file, which may be compressed into MP-3 format, and/or which may be "cleaned-up" using various background noise removal programs known in the art. Alternatively, the reader can use a hand-held recorder (such as a cassette recorder) and then provide the output of the recording medium as an input for a computer, and store the work as an audio-file, as discussed above. Typically, it will be the user's responsibility to place the work in a form that can be transmitted over a network, but in some embodiments, the web-site will accept recording media that have been physically delivered (e.g. by mail) to the provider for conversion to an appropriate audio file. Another option is to make the recording in a recording studio. Digital recording devices also allow direct creation of digitized audio performances and are within the scope of this aspect of the invention. In one embodiment, the reader is preferably encouraged to "clean" up the performance using software designed to improve the sound quality of recordings by eliminating background noise. In another embodiment, users are encouraged not to clean up the performance. In these embodiments, the provider applies a standardized cleanup procedure to each submission.

At 605, the reader submits the performance. In some embodiments, steps 603 and 605 can be collapsed into a single step, where the reader's voice is transmitted directly to the web-site and recorded there. This can be accomplished by means of technology well known to those with skill in the art. In any event, in this embodiment, in the submitting step the reader typically also submits a binding certification relinquishing all of the reader's rights in electronic distribution of the work.

Figure 7:
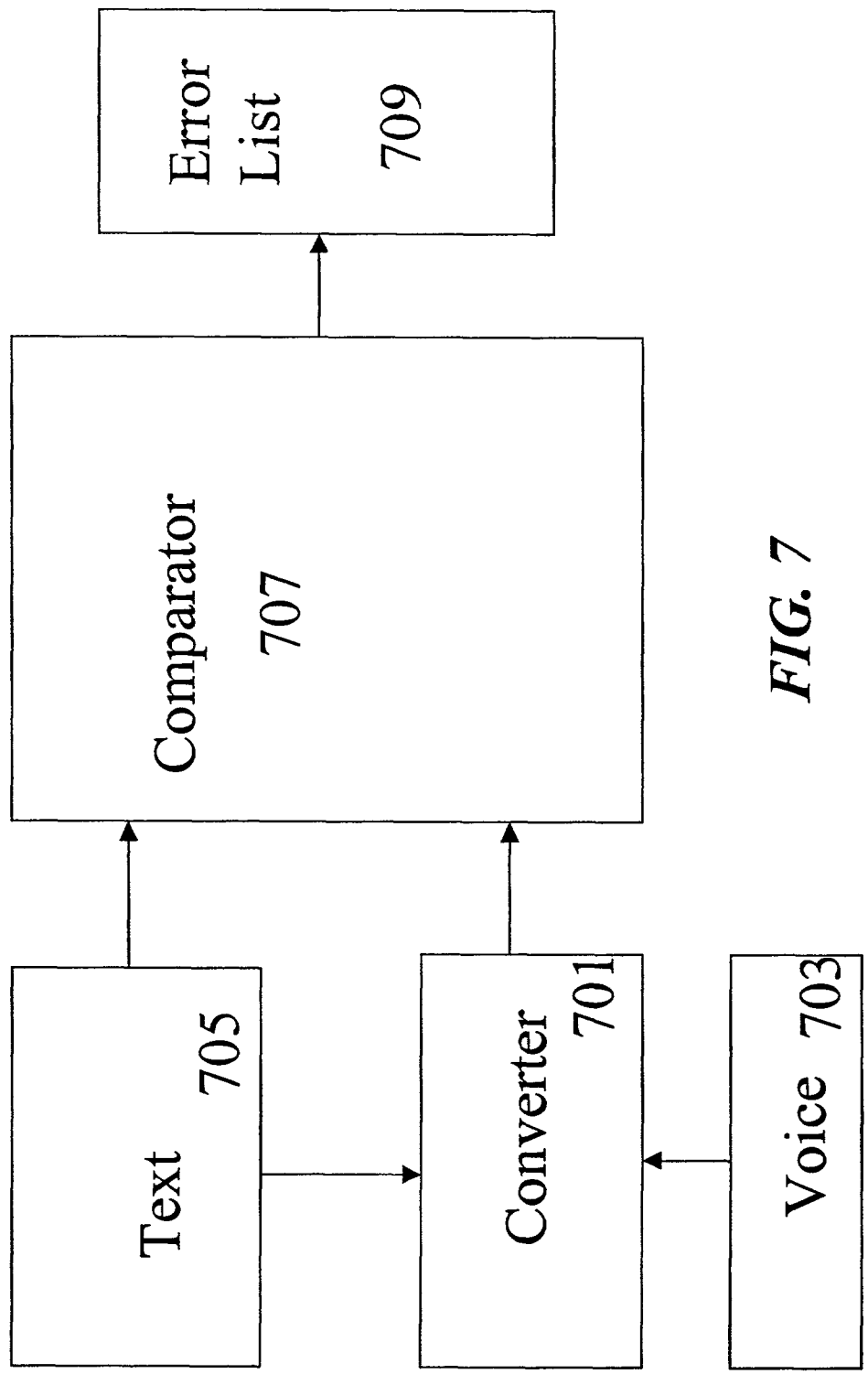
FIG. 7 shows a block diagram of an error checking system for detecting errors in audio performances according to an embodiment of the present invention.

At 607, the web-site receives the work. If the work was submitted in analog form, the web-site typically converts it into digitized form. Whether or not the text-comparison software described above is used in the creation of the work, such software is typically used by the web-site in order to check the accuracy of a given audio performance. Thus, the web site operator can run a word check-program on the submitted work, where the word check program compares the text of the audio performance with an electronic representation of the text. Using voice recognition technology, combined with the stored electronic text that tells the computer program what word should have been spoken, the computer program compares the spoken word to the electronic word, and collects any discrepancies for presentation to the web site operator, as illustrated in FIG. 7. Voice recognition technology used in this manner is considerably more accurate than voice recognition technology used in cases where the computer does not have access to the text that is being read.

The discrepancies are presented in a user-friendly format, per report generation step 611, such that the web-site operator can rapidly compare any given spoken sentence fragment in which a possible error was detected, with the intended text itself. In the case of innocent errors that do not significantly detract from the performance, the web-site operator can proceed with posting the work, along with information relating to the number of errors, providing the site visitors the ability to listen to the errors themselves. In the case of more serious errors, the web site operator can either reject the work outright, or offer the submitter the opportunity to correct any errors, either by resubmitting the work, or submitting a patch which could be inserted into the recording in place of the erroneous reading (as depicted by the dotted-line arrow between steps 611 and 603). Alternatively, the web-site operator can correct the errors himself, either with a human-generated patch, or by having a computer-generated voice speak the words in question.

Users would be instructed to make their recordings on the best equipment available, and with the least background noise. In one embodiment, the web-site uses voice-compression technology and other recording related technology to enhance the spoken performance, and to minimize the size of the file that must be stored. Thus, sounds that are not the user's voice, forming words, can be eliminated or reduced, using noise removal technology known in the art, and as used, for example, for mastering of recordings of musical performances. One example of software that can be used for automatically improving sound quality is Sonic Solutions No-Noise™ software available from Sonic, 101 Rowland Way, Novato, Calif. 94945.

Other ways in which the invention can improve the quality of the submitted works include (1) the spaces between the words could be digitally stretched and then replaced with perfectly silent space, and the words themselves could be digitally stretched and tones that are not part of the human voice could be removed, leaving a more or less pure human voice; and (2) to digitally mix two different voice readings, hereinafter a "first" and a "second" reading. Thus, each word is recognized for each reading, and each word is assigned a preferred length equal to its exact length of the word (in units of time) in the first readings. The identical words in the second reading are then digitally stretched or compressed to equal the length of the word in the first reading, for each word. Then the signals for each reading are combined to produce a blended-voice signal.

In one embodiment, readers have the option of reading an entire work, or just a portion of the work. Thus, the web-site could choose to "create" a public domain audioperformance of Moby Dick, by inviting submissions of no more than one chapter by any single individual. The web-site would select what it considers to be the best submissions for each chapter, and create the work that way. The submissions that were not selected could still be available on the web-site.

Provided the audio-checking component of the invention confirms that the text has been accurately read, a user can rapidly tell by sampling whether a particular reading of a particular text appeals to him.

FIG. 7 shows one embodiment of the text comparison software. Converter 701 receives as input voice 703, which is the reading submitted by the reader. Converter 701 also receives as input text 705, which is the text that is read by the reader. Converter 701 converts voice 703 to text, with reference to the expected text provided by text 705. Having access to expected text 705 enhances the accuracy of converter 701's voice recognition software, because the software can normally eliminate "guesses" that are not the actual text. The transcript of voice 703 produced by converter 701 is then fed into comparator 707, which conducts a comparison between the converted text and the actual text, and outputs any discrepancies into error list 709. In some embodiments, the comparison function can occur simultaneously with the conversion function, as will be evident to those with ordinary skill in the art.

Plays

In some embodiments, the invention is used to generate public domain plays, and can be used to generate public domain transcripts for animated versions of plays, especially where the animated product is in the public domain. An actor auditioning for a well-known play practices his lines with no expectation of compensation; such actors may be willing to perform readings of characters to submit to a centralized "play-making" Internet site.

Thus, for example, in a preferred embodiment the web-site contains electronic texts of all of Shakespeare's plays. When the web-site is first opened to the public, a person wishing to listen to a Shakespeare play could do so using her computer system, but the voices would be computer generated voices. As more readers submit readings of Shakespeare characters, a high quality, uncopyrighted reading results. If the invention has resulted in one or more animated versions of Shakespeare plays falling into the public domain, foreign language soundtracks of those versions can be generated using the audio performance feature of the invention.

Computer technology today is easily capable of making a play in this manner. In the case where the play was created from separate submissions by a plurality of actors playing the various parts, the play can be accessed by a user where all parts in a particular scene are present except one. Such partial plays provide a useful tool for actors rehearsing their lines, by providing readings of the other player's lines. Thus a user wishing to play the part of Hamlet in Act I, scene 2 of the play of that name could, using the web-site, generate a play having the parts of all the players but Hamlet in that particular scene. In some embodiments, as discussed in the context of videos above, software is used to enable the user to skip around in the play just to the line or lines before the line of his character. In such embodiments, it does not matter whether the part the user wants to play is blank or not; the user simply says the lines at the appropriate times, and the users lines are recorded, either directly into a file containing the entire play (and thus potentially overwriting preexisting lines by the same part), or into a separate file, for later combination with a version of the play.

It should be noted that an audio file containing simply one character's lines—or indeed any unique sequence of words found in a first audio file—can easily be merged with the first audio file to create a new audio file. In other words, suppose an actor reads the lines of Hamlet, from the play Hamlet, in order, as prompted by the computer system. The lines are recorded, in order in a separate file. Using voice recognition software, the computer can easily determine how to merge the single-part file with the original file to create a new work. One way of doing it as follows.

It should be noted that the "voice recognition" software need not actually convert the voices to text; rather, the software merely compares the voice signals from the first audio file to those of the new audio file. Identical lines will easily be detected, and the portions of the new audio file corresponding to lines in the first audio file will replace those lines.

In some embodiments, the program does not check the lines for accuracy, but rather accepts them as is. Thus, the lines of the character Hamlet read in German, or a play where each line of the character Hamlet is parodied—can be merged into a file containing the remainder of the play.

While the chance for recognition may be incentive enough to entice some users to contribute electronic text—and indeed it is within the scope of the invention to ask the users to contribute money in order to have their work posted on the site—other incentives may be required to attract additional contributions. As already mentioned, in one embodiment, an additional incentive involves using the web-site as a dating service. Thus, a contributor of recorded text can also contribute personal information, which then can be made available to persons meeting his or her specifications (in terms of geography, and whatever other specifications the person might want to put down). Alternatively, access to a contributor's personal information might additionally be conditioned on contribution of recorded text by the person interested in the contributor, thereby causing more contributions of recorded text. The fact that the recorded text is used as a means of getting dates would assure a relatively high quality of recorded text readings.

Opera

Another area particularly well-suited for practicing the principles of the invention is opera. The librettos for most operas have been translated into several languages, and many such translations are in the public domain. Additional translations can be inexpensively generated and donated to the public domain or purchased by the public in a cooperative auction. If the rights to a recorded performance of an opera were to be transferred to the public domain, pursuant to a donation by the rightholder, or a purchase by a cooperative auction as described above, the opera—or a library of such operas—could provide a useful tool for learning the language of the opera or operas, as well as a useful tool for individuals preparing to see an opera in a language with which they are not familiar.

Thus, in an embodiment of the current invention, software for creating a vocabulary list for an opera is provided. The software has access to the libretto in the original language, the translated libretto, and a dictionary that translates between the two languages. As output, the software can generate a list of all the words in the libretto, along-side their translations. A viewer can review the list of words and translations in hardcopy or on a computer monitor or TV screen. Thus, for a translation of an Italian opera into English, the user can view a list of Italian words translated into English, or (alternatively) a list of English words translated into Italian. As part of studying the lists, the user can click on a given word and be presented with text from the libretto showing how the word was used in the opera. The text can include an entire aria or segment of recitative, or might show only the sentence in which the word appeared. The user may also, or as an alternative, be provided the ability to click on a word to hear how it is used in the opera.

In some embodiments, the computer program stores such information as (1) the type of word (noun, pronoun, article, verb, adjective, adverb, etc.), and (2) the frequency of use of the word in the opera. Thus, a user may specify that he wants to study only the nouns, or just the nouns and verbs, or only the nouns, verbs, adjectives and adverbs, in the opera, presented in order of frequency of appearance. By thus having the opportunity to study and learn just the most-repeated words prior to viewing an opera, the user may enhance his appreciation and understanding of the opera, with minimal preparation time.

Submission of Written Works

Figure 8:
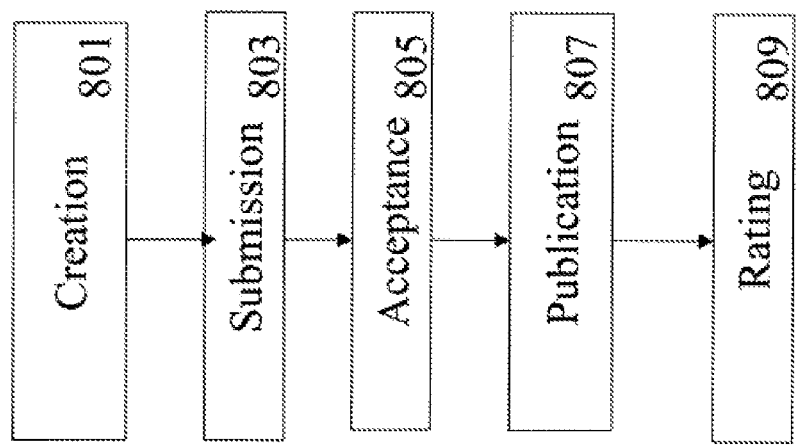
FIG. 8 presents a flow diagram for submission of literary works to a web-site pursuant to an embodiment of the invention.

FIG. 8 depicts the invention as applied to the submission of written works, such as novels, short stories, non-fiction works, and PhD theses. At 801, the author creates the work. Step 801 may be accomplished for the specific purpose of submitting the work to the web-site, or may simply be a work—whether previously published or not—that the author owns the rights to. Thus, a first novel, which the author hoped to get published, but which was rejected by the publishers he sent it to, would be a prime candidate for submission to the web-site. Also, short stories—which require relatively little effort to create, but which give the reader enough sense of the author to judge whether or not the author's style is appealing—represent excellent candidates for submission to the web-site. Again, the author might write the story specifically for submission to the web-site, or the author might have written it for some other purpose. Similarly, PhD theses, which represent a sunk cost to the author in terms of effort, and which may never otherwise be published, are good candidates for donation. Thus, provided that the author has the rights that need to be transferred to the public, the author can submit the written work.

As with the submission of audio and video performances, the web-site can offer various sorts of inducements in order to encourage authors to submit their written work. In many cases, this may not be necessary. For example, someone who has not been able to find a publisher for a first novel, or someone who realizes that there is little chance that his PhD thesis will be published, may require no inducement other than the opportunity for recognition.

At 803, the author submits the work to the web-site, typically as a text file over a computer network. It will be understood by those with skill in the art that other means of transmission (such as delivering to the web site operator a computer disk with the work stored on it) will also be possible. In connection with the submission step, in some embodiments, the author executes a legally binding document that effectuates the transfer of the author's rights (or some of the author's rights) in the work to the public domain, as discussed above. In other embodiments, this step occurs after the web-site has "accepted" the work for publication. Typically, the web-site agrees to provide the public access to the work for a specified minimum period of time in exchange for the author's willingness to transfer his rights to the public domain.

In a preferred embodiment, especially where the work is a longer work, and the creator is not well known to the reading public, the web-site may require the author to submit something else, that could be preliminarily read by readers who would otherwise be at a loss to decide whether or not to invest the time necessary to read the author's work. This piece to be submitted could take various forms, and various bits of information (e.g. related to the author's educational background) could be required, and other bits could be optional. At bottom, this secondary piece would be the author's attempt to persuade a potential reader to read the larger work. Thus, an author could point to a glittering resume or publication success of other works in order to persuade the reader to read. In addition, the author might provide a description of what she was attempting to accomplish with the larger work, or in some other way provide insight into the larger work. Obviously, if the author's defense is well-written and engaging, this fact alone (apart from its substance) might be enough to persuade some readers to give the larger work a try.

At 805, the web-site receives or "accepts" the work. In a preferred embodiment, the web-site operator runs the submission through a spell and grammar checker, which then provides a listing of possible errors to the web-site operator. Special software created for this purpose, to permit the web-site operator to view only potential errors, as well as their context, without having to wade through the entire text (as is the case with error-checking programs associated with word processing systems) is a part of this embodiment of this invention. The web-site operator, viewing the error printout, thus can give a first pass as to whether or not the work is worth posting. If the work is riddled with genuine errors, the web-site might simply reject it, or in any event would not post it in uncorrected form. On the other hand, if the only "errors" detected by the error-checking program are not errors at all, then the work will have a passed a first test.

At 807, the web-site posts the work for reading and downloading by the public. The posting is accompanied by an appropriate indication—in some cases, a symbolic representation—of exactly what rights the author has relinquished in the work.

Step 809 provides a mechanism for rating the work so that other readers can determine for themselves whether or not to invest the time required to review a particular work. Obviously, any rating system is subjective. In a preferred embodiment, the web-site would attempt to convey as much information as possible for the reader to judge whether or not a particular work will appeal to him. Thus, the reader will have access to the author's "defense" of the work, described above. In addition, the reader will have access to reader reviews (and will be encouraged to write one himself). Members of the web-site staff can also review the works, thereby providing (over time) readers the ability to predict whether or not they will like the work, based on past experiences with a particular reviewers preferences. In this respect, reader reviewers might also provide answers to a simple questionnaire that can be used by a reader to judge whether or not the reader-reviewer's opinion is likely to conform to the reader's opinion. Such a questionnaire could include questions about what the reviewer's favorite books are in different genres, and could also ask the reader to identify particular passages in the reviewed work that the reviewer found particularly stimulating. Reviewers could be asked to specifically address the "wit" content of a particular book, recognizing that some readers look for wittiness even in the treatment of serious subjects. In addition to having access to the author's "defense" and reviews by web-site operators and other readers, prospective readers also have access to the entire text itself, and can skim the text—much as one would at a bookstore—to find whether the author's style seems appealing (this last ability distinguishes the rating system of the web-site to those found at book selling sites, which rarely provide access to any text from the book under consideration).

CONCLUSION

The invention has been described in the context of submission of audio performances of public domain works, musical performances, and written works, as well as cooperative auctioning of copyright rights and patent rights. Although the description above contains many specificities, these should not be construed as limiting the scope of the invention but as merely providing illustrations of some of the presently preferred embodiments of this invention. Thus, the scope of the invention should be determined by the appended claims and their legal equivalents, as well as by the claims and equivalents of claims on related applications, rather than by the examples given.

We claim:

1. A method for using a computer system to hold a cooperative auction to effectuate an action related to a cause comprising, in sequence:
   a) identifying a cause;
   b) identifying an entity capable of performing an action related to the cause;
   c) setting parameters for the cooperative auction, said parameters comprising
      identifying a price for the action and
      specifying, via a computer system, a deadline for receiving pledges earmarked for the action;
   d) receiving, via a computer system, before the deadline, a plurality of pledges of value units earmarked for the action; and
   e) providing consideration to the entity in exchange for performance of the action, where the consideration comprises value units pledged in step d.

2. The method of claim 1, further comprising the step of: entering an agreement with the entity, the agreement containing a condition such that, if the condition is met, the entity agrees to take the action.

3. The method of claim 2, wherein the agreement is entered prior to receipt of pledges, and wherein the agreement specifies a time limitation related to payment of the price.

4. The method of claim 3, wherein the time limitation comprises a deadline for receiving pledges.

5. The method of claim 4, wherein the plurality of pledges are made by at least one bidder, and the at least one bidder may set an expiration time for his pledge.

6. The method of claim 5, wherein a bidder's pledge results in a transfer of value units from the bidder if the condition is met prior to expiration of the pledge.

7. The method of claim 2, wherein the condition is that the total amount of pledges equals a predetermined price.

8. The method of claim 2, wherein the entity is the holder of an intellectual property right, and the cause is the extinguishment of the intellectual property right.

9. The method of claim 8, wherein the action is renunciation of said intellectual property right.

10. The method of claim 9, wherein the intellectual property right is a patent right.

11. The method of claim 10, wherein the patent right is a license to manufacture a product for a particular purpose.

12. The method of claim 8, wherein the extinguishment of the intellectual property right is effectuated by transferring the intellectual property right to a second entity, wherein the second entity has represented that it will not enforce the intellectual property right.

13. The method of claim 8, wherein the intellectual property right is a copyright right.

14. The method of claim 13, wherein the copyright right is the right of electronic distribution of a copyrighted work.

15. The method of claim 13, wherein the copyright right is the right to reproduce a copyrighted work.

16. The method of claim 13, wherein the copyright right is the right to make a derivative work of a copyrighted work.

17. A computer storage medium, encoded with a computer program for holding a cooperative auction to induce an entity to perform an action related to a cause, comprising:
   a) means for specifying a cause;
   b) means for specifying an entity capable of performing an action related to the cause;
   c) means for setting parameters for the cooperative auction, said parameters comprising:
      i) the identity of said entity;
      ii) a price for the action; and
      iii) a deadline for receiving pledges earmarked for the action;
   d) means for receiving, via a computer system, before the deadline, a plurality of pledges of value units earmarked for the action; and
   e) means for ending the cooperative auction when the price specified in c.ii is met.

* * * * *